R. L. FRINK.
AIR DUCT FOR GLASS DRAWING POTS AND METHOD OF LIBERATING AND SETTING THE SAME.
APPLICATION FILED NOV. 25, 1912.
1,165,963. Patented Dec. 28, 1915.
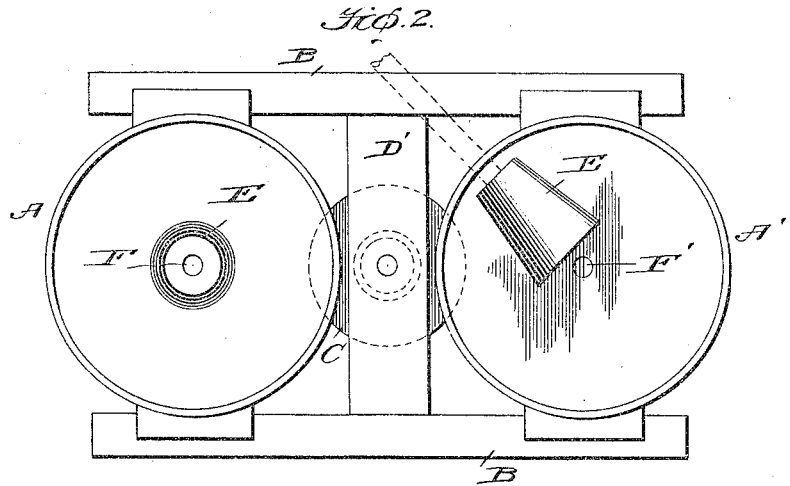
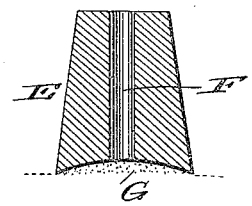
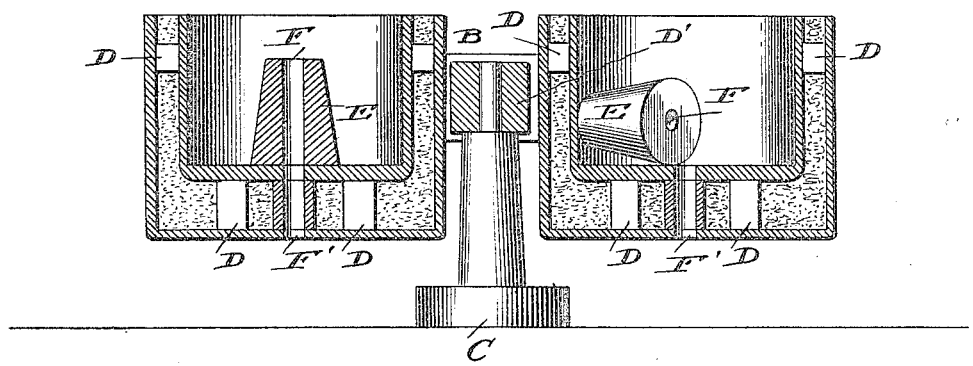
WITNESSES
INVENTOR
Robert L. Frink
Charles C. Stauffer
Attorney

UNITED STATES PATENT OFFICE.

ROBERT L. FRINK, OF LANCASTER, OHIO.

AIR-DUCT FOR GLASS-DRAWING POTS AND METHOD OF LIBERATING AND SETTING THE SAME.

1,165,963.

Specification of Letters Patent.

Patented Dec. 28, 1915.

Application filed November 25, 1912. Serial No. 733,333.

*To all whom it may concern:*

Be it known that I, ROBERT L. FRINK, a citizen of the United States, residing at Lancaster, in the county of Fairfield and State of Ohio, have invented certain new and useful Improvements in Air-Ducts for Glass-Drawing Pots and Methods of Liberating and Setting the Same, of which the following is a specification.

My invention relates to a novel combination of parts which overcomes an obstacle that heretofore has been of serious character in the use of glass-drawing pots from which cylinders of glass are produced by mechanical means, similar to that shown in my pending application Sr. No. 416,230, filed February 17th, 1908, and also in my pending application Sr. No. 485,677, filed March 25th, 1909, and in which is shown an air duct passing upwardly through and from the bottom of the pot, arising above the glass batch.

In the use of this apparatus it was found desirable to supply means whereby the residual glass remaining in the pot, after the cylinder was formed, could be melted down and removed by draining through the bottom, and for this purpose as is shown in pending application 416,230, I have provided a plug for closing the opening through which such residual glass could be drained, but after my adoption of the air-supply means, and duct which conveyed said air into the interior of the cylinder, as is shown in pending application 485,677, the plug before mentioned obviously could not be used, and I have therefore designed the present form of combined air duct and closure herein described.

My invention includes also the process of manipulating the apparatus, that is of liberating and setting the air duct.

In the drawings Figure 1 is a side elevation, partially in section, of a pair of glass-drawing receptacles, mounted upon their revolving support. Fig. 2 is a plan view of the same. Fig. 3 is a detail of the plug, showing a modification of the bottom.

Like letters indicate like parts in all figures.

A, A' indicate the pots, the construction of which may be of any suitable design, but as here shown is the like or equivalent of that shown and described in my pending application No. 416,230, my pot is constructed of a metal jacket, a fire-clay receptacle contained therein, interposing between said receptacle and jacket insulating material of a suitable character, plugs D being used to keep the clay receptacle in position.

B represents channel sections carried by a base member C, and pivotally supported thereon. Upon these channel sections are supported the pots A, said sections being supported upon the member C by bracket or cross piece D'.

Within each pot there is illustrated a member, the principal object of my invention, which consists of a fire clay tube E of suitable cross-section, large enough to have the required mechanical strength after a hole, or passage F has been made therethrough of sufficient size to be equal to, or in excess of the air passage F' through the bottom of the pot. This tube may be constructed in such a manner that its bottom surface shall be slightly concave, as shown in Fig. 3, it being found that such design has advantage over other forms for reasons hereinafter explained.

The simplicity of this arrangement and construction is obvious, however at the time it was first designed, all of those who were practical and skilled in the art, declared it to be impracticable and impossible of use and application, because the molten glass which is ladled into the pot and completely surrounds the tube, would disengage it from its seat and cause it to float upwardly and away from its intended position. However, my method of using this tube has overcome any such difficulty, and this is as follows: Assuming that a roller or cylinder of glass has just been completed in one of vessels A, this is then severed from the small amount of glass remaining in the pot, and the frame carrying the pot is then rotated so that the latter shall come underneath the usual heating station, where the pot and glass therein receive heat enough to cause the glass to be quite soft and liquid. An iron bar or other suitable implement is placed against the top of the tube, or duct, and it is pushed over upon its side, as is indicated in Fig. 1, which permits the molten glass to issue through duct F'. After sufficient of the glass has run out through F', another suitable instrument is inserted into the mouth of the tube E, which by a simple movement, is replaced in its seated position surrounding the opening of duct F', this being done prior to the transfer of this pot to a position to receive the new charge of molten glass from which another cylinder is to be drawn. The duct F having two or three minutes, or perhaps longer, to rest in this position, by reason of its weight and the temperature, will have made close contact with the bottom of the pot and by reason of its construction, the outer edges will have come in closer contact with the bottom than the inner edges, which leaves a somewhat greater mass of glass G under that portion of the tube immediately surrounding the opening F'. By reason of the current of air which is passing through F preceding the ladling of the glass into the pot, this glass which is beneath the tube and between the surfaces of the tube and bottom of the pot becomes chilled at once. Furthermore, it is well known that glass which lies in immediate contact with clay materials, and at sufficiently high temperatures, such temperatures being considerably below that which is here produced, absorbs no inconsiderable alumina, which raises the melting point, also the softening point of the glass, and very materially increases the surface tension and viscosity at any given temperature. Therefore it will be obvious that by reason of the peculiar design, method of use, cooling effect of the air, and chemical changes, I am enabled to accomplish that which heretofore has been considered as impracticable and impossible, and because of this

I claim:

1. The combination with a glass working vessel having an opening in its bottom, of a tubular member adapted to rest upon the bottom of said vessel and normally to extend above the level of the glass contained in said vessel.

2. The combination with a glass working vessel having an opening in its bottom, of a tubular member adapted to rest upon the bottom of said vessel and normally to extend above the level of the glass contained in said vessel, said member in such position acting as an inner retaining wall for the glass and being movable to uncover the opening in said vessel to permit the latter to drain.

3. The combination with a glass working vessel having a drain opening in its bottom, of a member movably mounted on such bottom and provided with an air passage therethrough registering with such drain opening when said member is positioned to retain glass within said vessel.

4. The combination with a glass working vessel having a drain opening in its bottom, of a frusto-conical member movably mounted on such bottom and provided with an air passage therethrough registering with such drain opening when said member is positioned over the latter.

5. The combination with a substantially flat-bottomed receptacle for glass provided with a heat-insulating support and an opening vertically through its bottom and said support, of a movable tubular member having an opening adapted to register with the opening in the bottom of said receptacle and said support, said member being tiltable to uncover such opening, substantially as described.

6. The combination with a substantially flat-bottomed receptacle for glass provided with a heat-insulating support and an opening vertically through its bottom and said support, of a movable tubular member having an opening adapted to register with the opening in the bottom of said receptacle and support, said member having its bottom concave and being tiltable to uncover such opening, substantially as described.

7. The combination with a substantially flat-bottomed receptacle for glass provided with a heat-insulating support and an opening vertically through its bottom and said support, of a movable tubular member of general frusto-conical form having an opening adapted to register with the opening in the bottom of said receptacle and said support, said member having its bottom concave and being tiltable to uncover such opening, substantially as described.

8. The method of sealing a movable tubular fluid-conducting member in the bottom of a glass working receptacle, which consists in heating said member and receptacle until the glass adhering to them becomes fluid, placing said member in proper position in said receptacle, passing a cooling fluid through said member sufficient to chill at least a portion of the glass between the same and said receptacle, and then pouring into the receptacle a charge of glass.

9. The method of effecting the liberation and affixing of a movable air duct in the perforated bottom of a glass working receptacle, which consists in heating said duct and receptacle until the glass adhering to them and securing the duct in place is fused, moving said duct so as to uncover the perforation in the receptacle, continuing the heating until the residual glass has substantially entirely drained through such perforation, the film of glass still adhering to said duct and receptacle being fluid, setting said duct again in position, passing sufficient air through said duct to congeal the glass between the same and the bottom of the receptacle, thereby securing said duct again in place, and then pouring in the receptacle a fresh charge of glass.

In testimony whereof I affix my signature in presence of two witnesses.

ROBERT L. FRINK.

Witnesses:
S. C. HILL,
H. F. MOONEY.